April 14, 1953     D. A. DOMEK ET AL     2,634,447
ROTARY WINDSHIELD WIPER

Filed Dec. 30, 1947     2 SHEETS—SHEET 1

Daniel A. Domek
Einar N. Sorensen
INVENTOR.

April 14, 1953     D. A. DOMEK ET AL     2,634,447
ROTARY WINDSHIELD WIPER
Filed Dec. 30, 1947     2 SHEETS—SHEET 2
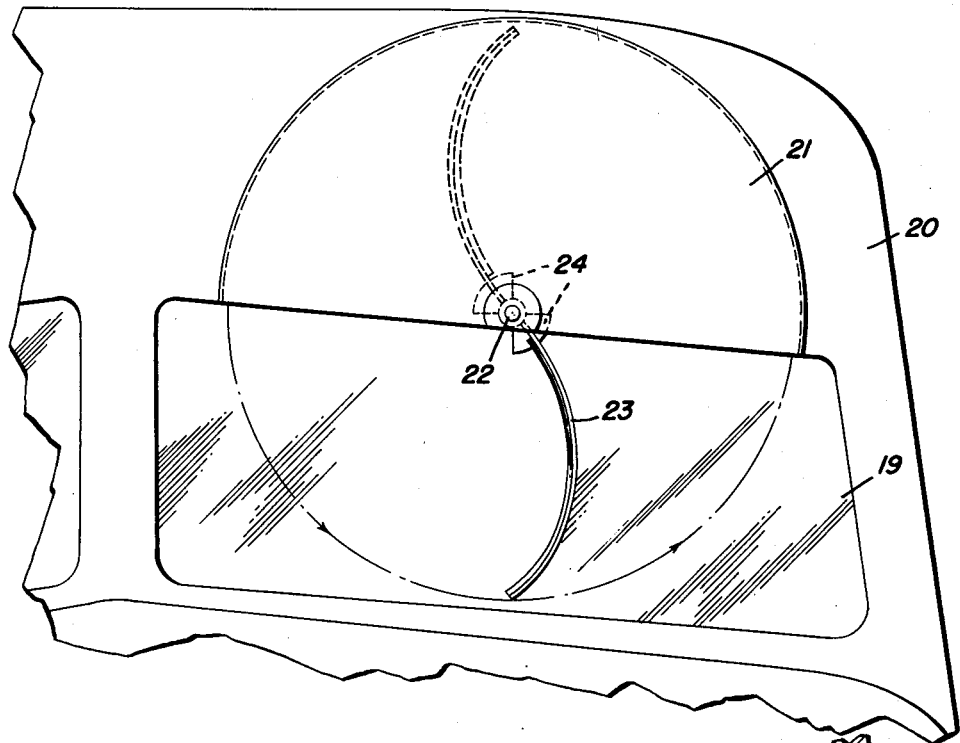
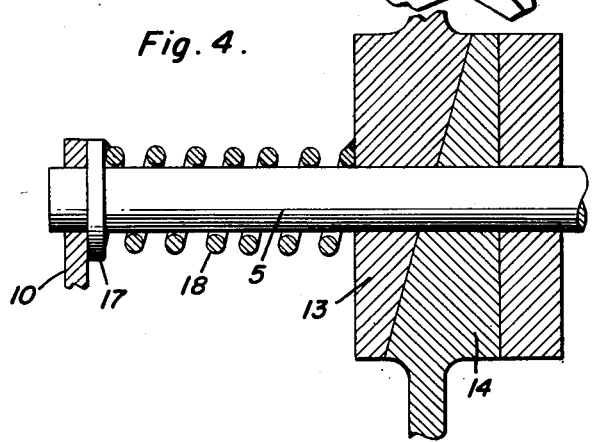
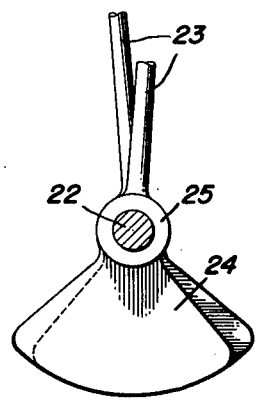
Daniel A. Domek
Einar N. Sorensen
INVENTOR.

Patented Apr. 14, 1953

2,634,447

UNITED STATES PATENT OFFICE 2,634,447

ROTARY WINDSHIELD WIPER

Daniel A. Domek and Einar N. Sorensen, Palatine, Ill.

Application December 30, 1947, Serial No. 794,678

2 Claims. (Cl. 15—250)

The present invention relates to new and useful improvements in windshield wipers for automobiles and other motor vehicles and more particularly to a rotary windshield wiper.

An important object of the invention is to provide a rotary windshield wiper provided with a separate motor for driving the same whereby the wiper may be rotated at a constant speed and not subject to fluctuation in the speed thereof which is common in the usual type of suction operated wipers when the engine is under a heavy load.

A further object of the invention is to provide a rotary windshield wiper including blades which are automatically moved out of the vision of the driver when the wiper is idle.

A still further object is to provide a device of this character of simple and practical construction, which is efficient and reliable in operation, neat and attractive in appearance, relatively inexpensive to manufacture and install in operative position and which otherwise is well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 4 is a similar view showing the hub and blade in operating position;

Figure 5 is a view in elevation of a modified type of windshield showing the housing for the blade positioned above the windshield; and, Figure 6 is a detail of the modified blade construction showing the counterweight for automatically raising the blades in the housing when the wiper is idle.

Figure 1:
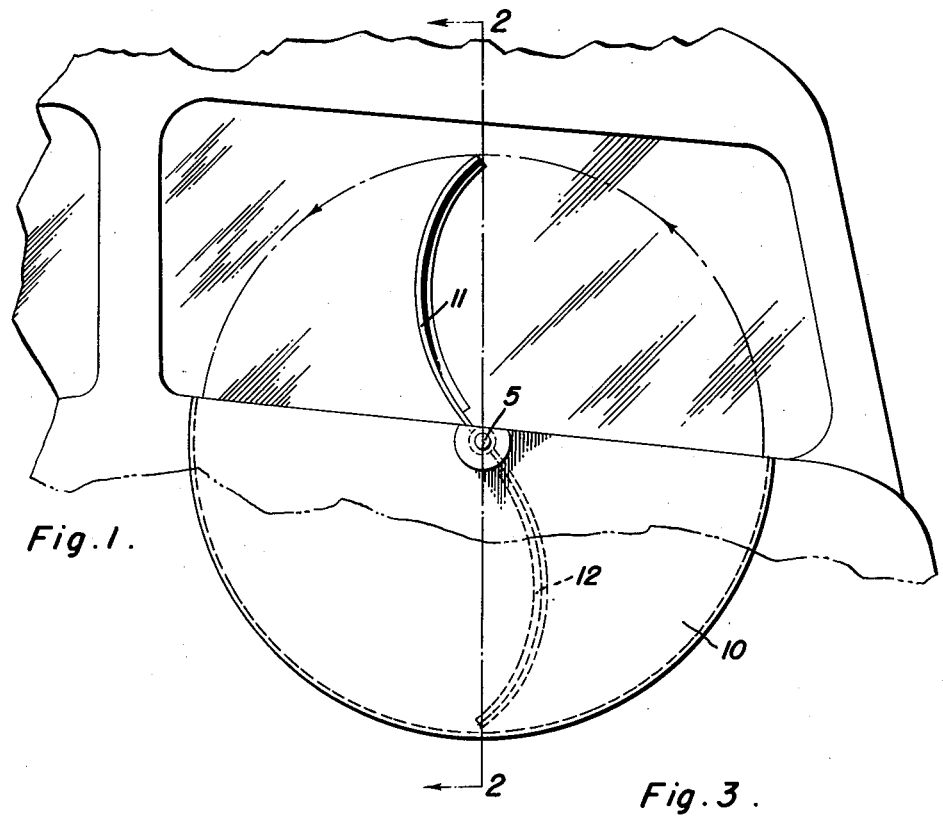
Figure 1 is a view in elevation of an automobile windshield showing the wiper mounted in position thereon.

Referring now to the drawings in detail and first with respect to the form of the invention illustrated in Figures 1 to 4 inclusive the numeral 5 designates a motor shaft having a motor 6 at one end thereof, the shaft being journaled in a bearing 7 secured in a windshield 8 of a motor driven vehicle and with the motor 6 positioned inwardly of the windshield.

The windshield is shown projecting below the cowl 9 of the vehicle and in which is positioned a semi-circular housing 10 with the outer end of the shaft 5 journaled in the upper edge of the housing.

A pair of wiper blades 11 and 12 are provided at their inner ends with hub portions 13 and 14 freely mounted on the shaft 5 and having inclined opposed faces 15 and 16 respectively.

The shaft 5 is provided with a flange or washer 17 suitably secured thereto and disposed inwardly of the housing 10 and mounted on the shaft between the flange 17 and the adjacent hub 13 is a coil spring 18 having its ends welded or otherwise suitably secured respectively to the flange and the hub.

Figures 2, 3:
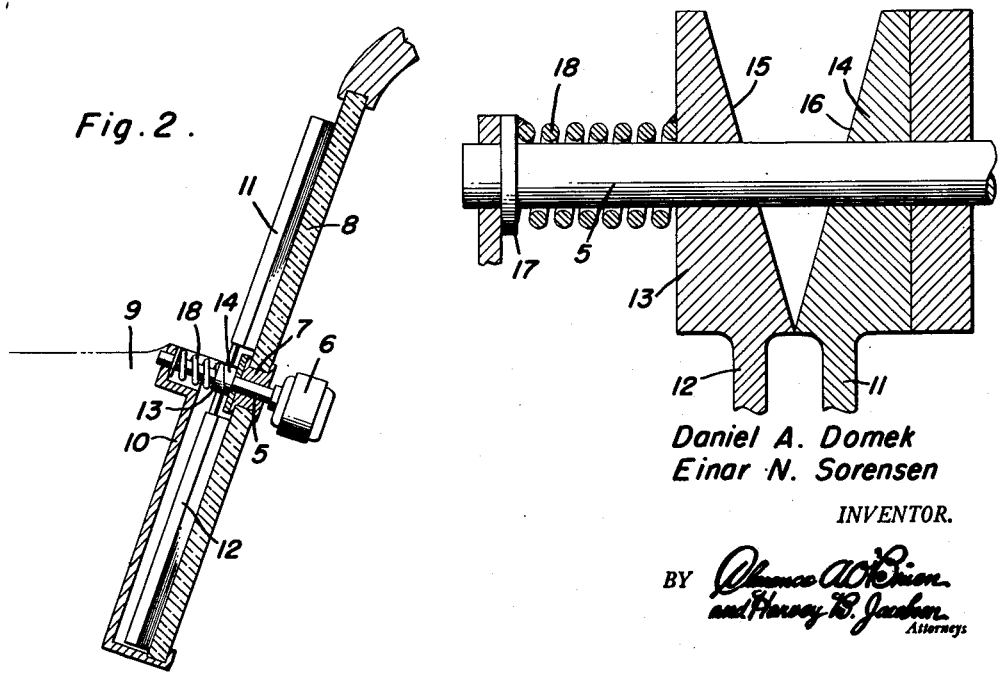
Figure 2 is a vertical sectional view taken on the line 2—2 of Figure 1.
Figure 3 is an enlarged sectional view of the hub for the wiper blade and showing the blade in concealed position when the wiper is idle.

In the operation of the device the spring 18 remains fully contracted when the motor 6 is idle, as shown in Figure 3 of the drawings, whereupon hub 13 will be held free of hub 14 and permit blades 11 and 12 to gravitate downwardly in housing 10 in a concealed position. Shaft 5 is free to turn when motor 6 is idle.

When the shaft 5 is driven by motor 6 the spring 18, which is fixed at one end to the shaft by the flange 17, will likewise rotate with the shaft and by reason of its connection to the hub 13 will initially rotate the latter. The resiliency of the spring will cause a drag in the rotation of hub 13 relative to shaft 5 and the motor is rotated in a direction to subject the spring to an uncoiling force which will result in an expanding or stretching action of the spring. This stretching action of the spring, as the hub 13 rotates, will slide hub 13 toward hub 14 and when the opposed inclined faces 15 and 16 of the hubs contact, as shown in Figure 4, a friction clutch drive will be established between hubs 13 and 14 to also drive the latter.

In the form of the invention illustrated in Figures 5 and 6 the windshield 19 is mounted in a truck cab 20 which extends above the windshield and in which the semi-circular housing 21 is positioned. The motor driven shaft 22 is journaled in the lower edge of the housing immediately above the windshield 19.

The inner ends of the wiper arms 23 are provided with counterweights 24 at a diametrically opposite side of the hub 25.

When the wiper motor is idle the counterweights 24 will gravitate below the shaft 26 and swing the wiper arms 23 and blades upwardly into the housing 21 into a concealed position.

Because of the rotary action of the blades, and the speed thereof, the blades are substantially invisible while in operation and the surface more effectively cleaned and the wiper quieter in operation than the oscillating type of wiper due to the absence of any reversing action.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A windshield wiper comprising a rotatable shaft, a wiper blade freely rotatable on the shaft, a second wiper blade slidably and rotatably mounted on the shaft, and resilient expansible and contractible means connecting the second blade to the shaft for rotation with the shaft, said means being expanded and contracted by variations in the load subjected thereto for sliding the second blade into and out of friction driving engagement with the first blade.

2. A windshield wiper comprising a rotatable shaft, a plurality of wiper blades in wiping engagement with a windshield and each having a hub independently journaled on the shaft, one of said hubs also being slidable on the shaft relative to the other of said hubs, and a resilient, expansible and contractible driving connector between the shaft and said one hub and including a first end portion fixed to the shaft and a second end portion fixed to said one hub, said connector being responsive to the load subjected to said one hub by the rotation of the shaft to expand the connector for slidably actuating said one hub into frictional driving engagement with the other of said hubs for rotation of both hubs with the shaft, and said connector contracting due to its inherent resiliency for releasing the hubs from driving engagement with each other when the shaft is idle and the load reduced.

DANIEL A. DOMEK.
EINAR N. SORENSEN.

References Cited in the file of this patent

UNITED STATES PATENTS

| Number | Name | Date |
|---|---|---|
| 1,075,915 | Houghton | Oct. 14, 1913 |
| 1,237,045 | Houren | Aug. 14, 1917 |
| 1,920,144 | Hueber | July 25, 1933 |
| 1,937,160 | Oishei | Nov. 28, 1933 |
| 2,100,055 | Horton | Nov. 23, 1937 |
| 2,161,682 | Rogers | June 6, 1939 |
| 2,181,066 | Rau | Nov. 21, 1939 |
| 2,239,754 | Marti | Apr. 29, 1941 |
| 2,246,740 | Lethbridge | June 24, 1941 |

FOREIGN PATENTS

| Number | Country | Date |
|---|---|---|
| 6,704 | Great Britain | 1913 |
| 474,157 | Great Britain | Oct. 21, 1937 |
| 565,918 | France | Feb. 7, 1924 |